US009189223B2

(12) United States Patent
Oi

(10) Patent No.: US 9,189,223 B2
(45) Date of Patent: Nov. 17, 2015

(54) CONNECTING METHOD AND APPARATUS FOR CONNECTING A COMPONENT INCLUDED IN AN APPLICATION WITH AN EXTERNAL SERVICE

(75) Inventor: Hirokazu Oi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 13/086,803

(22) Filed: Apr. 14, 2011

(65) Prior Publication Data
US 2011/0276941 A1 Nov. 10, 2011

(30) Foreign Application Priority Data

May 6, 2010 (JP) ................................. 2010-106665

(51) Int. Cl.
G06F 9/44 (2006.01)
G06F 9/445 (2006.01)
G06F 9/54 (2006.01)

(52) U.S. Cl.
CPC . G06F 8/65 (2013.01); G06F 9/541 (2013.01)

(58) Field of Classification Search
None
See application file for complete search history.

(56) References Cited

U.S. PATENT DOCUMENTS

| 2004/0268312 | A1  |   | 12/2004 | Abe et al.       |         |
|--------------|-----|---|---------|------------------|---------|
| 2006/0122958 | A1  | * | 6/2006  | Beisiegel et al. | 707/1   |
| 2008/0140760 | A1  | * | 6/2008  | Conner et al.    | 709/201 |
| 2008/0140857 | A1  | * | 6/2008  | Conner et al.    | 709/236 |
| 2009/0031283 | A1  |   | 1/2009  | Oi               |         |
| 2010/0153918 | A1  | * | 6/2010  | Mallick et al.   | 717/121 |
| 2012/0102475 | A1  | * | 4/2012  | Huang et al.     | 717/168 |
| 2012/0110093 | A1  | * | 5/2012  | Tingstrom et al. | 709/206 |

FOREIGN PATENT DOCUMENTS

| JP | 10-254701 A    | 9/1998  |
|----|----------------|---------|
| JP | 2002366356 A   | 12/2002 |
| JP | 2006-285313 A  | 10/2006 |
| JP | 2008108155 A   | 5/2008  |

OTHER PUBLICATIONS

Yang et al., "Service components for managing the life-cycle of service Compositions", Information Systems 29 (2004) 97-125.*
SCA Service Component Architecture Assembly Model Specification Version 1.00, Mar. 15, 2007.
"Cosminexus Application Server V8 Guidance for SOAP Application Development," Hitachi, Ltd., Ver. 2 (Feb. 2010), pp. 126-129.
Nov. 1, 2013 Japanese Official Action in Japanese Patent Appln. No. 2010-106665.

* cited by examiner

Primary Examiner — Don Wong
Assistant Examiner — Daxin Wu
(74) Attorney, Agent, or Firm — Fitzpatrick, Cella, Harper & Scinto

(57) ABSTRACT

A connecting apparatus determines whether an external service is compatible with an interface through which a component connected with another component or another external service uses a service of the other component or the other external service, and if it is determined that the external service is compatible with the interface through which the component uses the other component or the other external service, modifies the connection so that the component connected with the other component or the other external service is connected with the external service. The connecting apparatus then executes the component connected with the external service.

16 Claims, 13 Drawing Sheets

FIG. 3A

```
 1: <composite>
 2:    <component name="A">
 3:       <reference name="b" target="B">
 4:          <interface.java interface="BBB"/>
 5:       </reference>
 6:       <reference name="c">
 7:          <interface.java interface="CCC">
 8:          <binding ws uri="URI OF SERVICE C"/>
 9:       </reference>
10:    </component>
11: </composite>
```

FIG. 3B

```
 1: <composite>
 2:    <component name="A">
 3:       <reference name="a" target="B">
 4:          <interface.java interface="BBB"/>
 5:          <alternative target="D"/>
 6:          <alternative target="E"/>
 7:       </reference>
 8:    </component>
 9:    <component name="F">
10:       <reference name="f" target="G">
11:          <interface.java interface="GGG">
12:          <alternative>
13:             <binding ws uri="URI OF SERVICE C"/>
14:          </alternative>
15:       </reference>
16:    </component>
17:    <component name="H">
18:       <reference name="h">
19:          <interface.java interface="III"/>
20:          <binding ws uri="URI OF SERVICE I"/>
21:          <alternative>
22:             <binding ws uri="URI OF SERVICE J"/>
23:          </alternative>
24:       </reference>
25:    </component>
26:    <component name="K">
27:       <reference name="k" target="L"/>
28:    </component>
29: </composite>
```

FIG. 3C

```
 1: <composite>
 2:   <component name="A">
 3:     <reference name="a" target="D">
 4:       <interface.java interface="BBB"/>
 5:       <alternative target="B"/>
 6:       <alternative target="E"/>
 7:     </reference>
 8:   </component>
 9:   <component name="F">
10:     <reference name="f">
11:       <interface.java interface="GGG"/>
12:       <binding ws uri="URI OF SERVICE C"/>
13:       </alternative target="G"/>
14:     </reference>
15:   </component>
16:   <component name="H">
17:     <reference name="h">
18:       <interface.java interface="III"/>
19:       <binding ws uri="URI OF SERVICE J"/>
21:       <alternative>
22:         <binding ws uri="URI OF SERVICE I"/>
22:       </alternative>
23:     </reference>
24:   </component>
25:   <component name="K">
26:     <reference name="k" target="L"/>
27:   </component>
28: </composite>
```

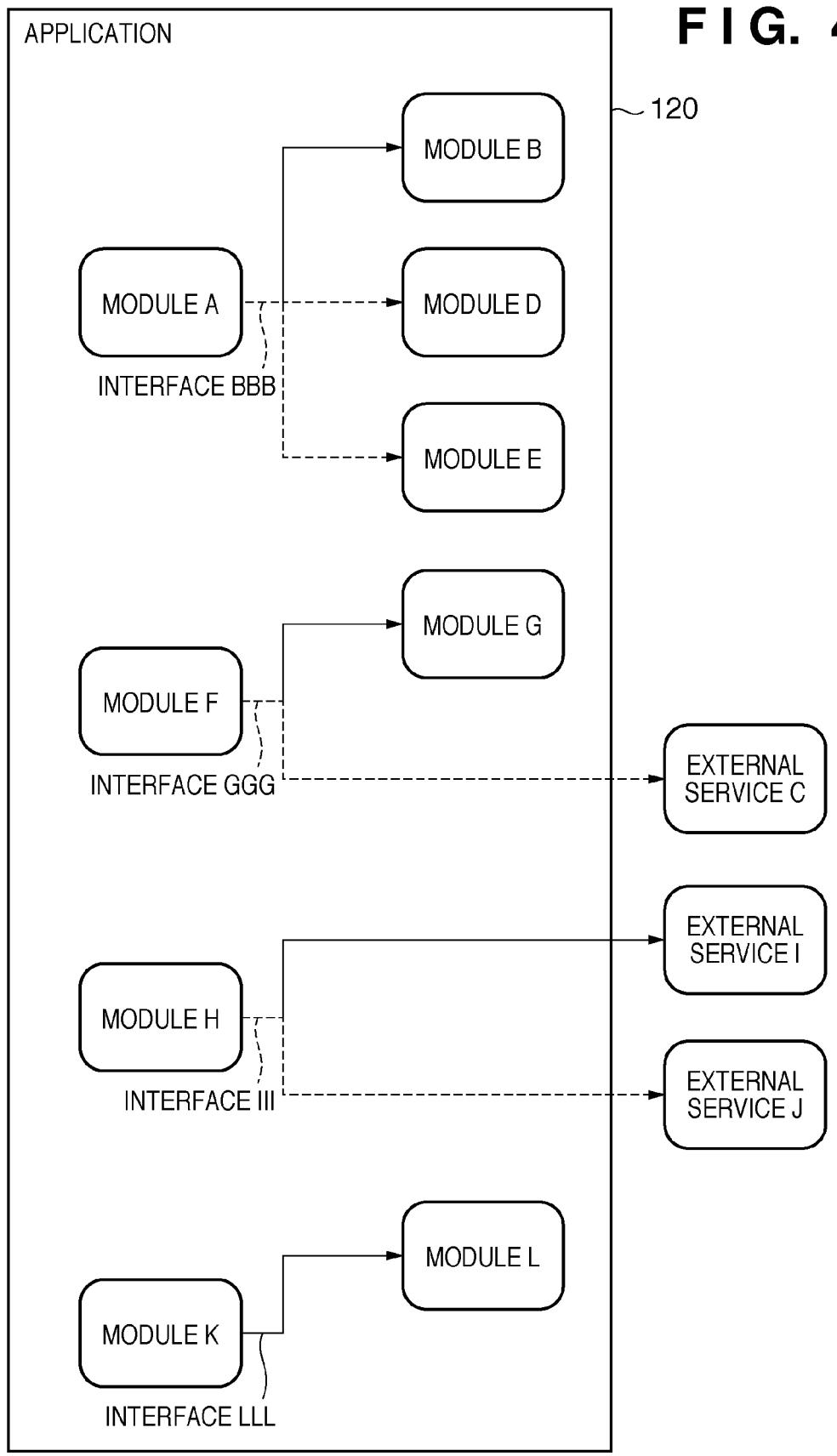

FIG. 5

| MODULE (501) | REFERENCE (502) | MODULE IN USE (503) | MODULE CANDIDATE (504) | INTERFACE (505) |
|---|---|---|---|---|
| MODULE A | REFERENCE a | MODULE B | MODULE D, MODULE E | INTERFACE BBB |
| MODULE F | REFERENCE f | MODULE G | EXTERNAL SERVICE C | INTERFACE GGG |
| MODULE H | REFERENCE h | EXTERNAL SERVICE I | EXTERNAL SERVICE J | INTERFACE III |
| MODULE K | REFERENCE k | MODULE L | N / A | INTERFACE LLL |

511, 512, 513, 514

F I G. 6
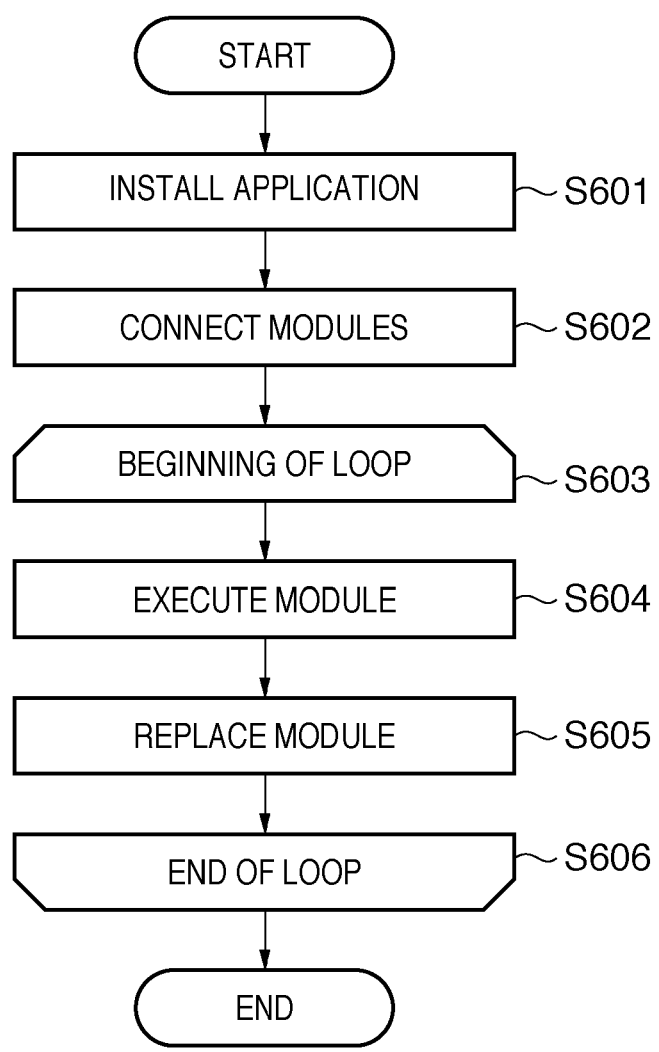

CONNECTING METHOD AND APPARATUS FOR CONNECTING A COMPONENT INCLUDED IN AN APPLICATION WITH AN EXTERNAL SERVICE

BACKGROUND OF THE INVENTION

1. Field of the Invention

The present invention relates to a connecting method and a connecting apparatus.

2. Description of the Related Art

There are various techniques for combining software components (hereinafter simply referred to as components) to build an application.

One such technique is Service Component Architecture, the specifications of which have been developed by the Open SOA Collaboration. SCA is characterized in that interfaces of components are simplified as services, references, and properties to facilitate combination of components in different languages and combination of various communication protocols. Details of the combination specifications are described in SCA Service Component Architecture, Assembly Model Specification Version 1.00, Mar. 15 2007.

The SCA specifications specify that components should be connected with each other by using a definition file written in an XML language. If one component uses another component, these components are connected as defined in a definition file. For the using component, it is not necessary to write code that directly calls functions of the component used.

Therefore, replacing a component used in an application with another component does not require rewriting code, if interfaces of both components match each other. This is an advantage of using the SCA technique.

Besides SCA, conventional techniques to replace a component or to verify compatibility between components to be connected, in connecting components to build an application, include the following.

In an exemplary technique, information about connected components is managed and updated on an application basis. On the occurrence of a trouble or at the time of automatic component switching, the version of a component to be switched is determined from the component information. Thus, the version of the component connected in the application is switched. See Japanese Patent Laid-Open No. 2008-108155, for example.

In another technique, based on information about combination between each developed program component in software and based on component attribute information, a specific developed program component forming a part of the developed software is replaced with a new developed program component while the structure of the software is maintained. See Japanese Patent Laid-Open No. 2002-366356, for example.

In a further technique, based on component invocation information extracted by a monitor that monitors component invocations, consistency between a component invocation and an invoked component is verified. See US 2004/0268312, for example.

The SCA characteristic of the easy component replacement is preferable. However, according to the SCA specifications, the content of a definition file must be determined when an application is build, because the definition file is part of the application. That is, to replace a component, the definition file must be modified. This means rebuilding the application is needed to replace a component. Thus, in SCA, a component can be replaced at the time of developing an application but not at the time of running the application.

It is desirable to enhance the flexibility of component replacement as much as possible. Even if components have the same interfaces, many other component characteristics are conceivable, such as performance, resources used, scalability, and availability. Accordingly, many components may be provided depending on desired characteristics. In such a situation, there may be a need for component replacement.

However, component replacement cannot be highly flexible if it requires redeveloping an application. If an application is installed in various devices and it is desired to vary its components from device to device, redeveloping the application for each device would involve an excessively high development cost.

Meanwhile, another situation exists in which component replacement is desired, as follows.

Many network services are provided today. Services that were unavailable are often realized by coordination of devices with network services. Here, consider a situation in which new network services are provided. The high frequency at which new network services are created and provided is incomparable with the frequency at which software in devices is updated. Therefore, it can always happen that network services are updated and improved while device software remains not updated.

In such a case, it has conventionally been difficult to coordinate a device with network services developed after the shipment of the device. Some devices are provided with a firmware update function, with which the devices may be coordinated with new network services. However, firmware update imposes load on a user, and it also involves a low degree of freedom of software modification from aspects such as the ROM capacity. Moreover, as in the above-described case, firmware update also requires development tasks.

SUMMARY OF THE INVENTION

The present invention provides an apparatus and a method to enable component replacement when running an application without the need to redevelop the application.

According to one aspect of the present invention, there is provided a connecting method for connecting a component included in an application with an external service, the method including: determining whether an external service is compatible with an interface through which a component connected with another component or another external service uses a service of the other component or the other external service; modifying connection so that the component connected with the other component or the other external service is connected with the external service, if it is determined that the external service is compatible with the interface through which the component uses the other component or the other external service; and executing the component connected with the external service.

Further features of the present invention will become apparent from the following description of exemplary embodiments with reference to the attached drawings.

BRIEF DESCRIPTION OF THE DRAWINGS

FIG. 3A is a diagram showing a component connection definition in which component connection relationships are described according to SCA specifications;

FIG. 3B is a diagram showing the component connection definition with an additional "alternative" tag;

FIG. 3C is a diagram showing an example of the updated component connection definition;

FIG. 4 is a diagram showing component connection relationships between a plurality of components and a plurality of external services;

FIG. 5 is a diagram showing tabular data representing the component connection relationships shown in FIG. 4;

FIG. 6 is a flowchart showing a general schematic process in performing component replacement;

DESCRIPTION OF THE EMBODIMENTS

With reference to the drawings, embodiments for implementing the present invention will be described in detail below. In the embodiments, a component connecting apparatus that connects software components (components) with each other to build an application will be described.

Figure 1:
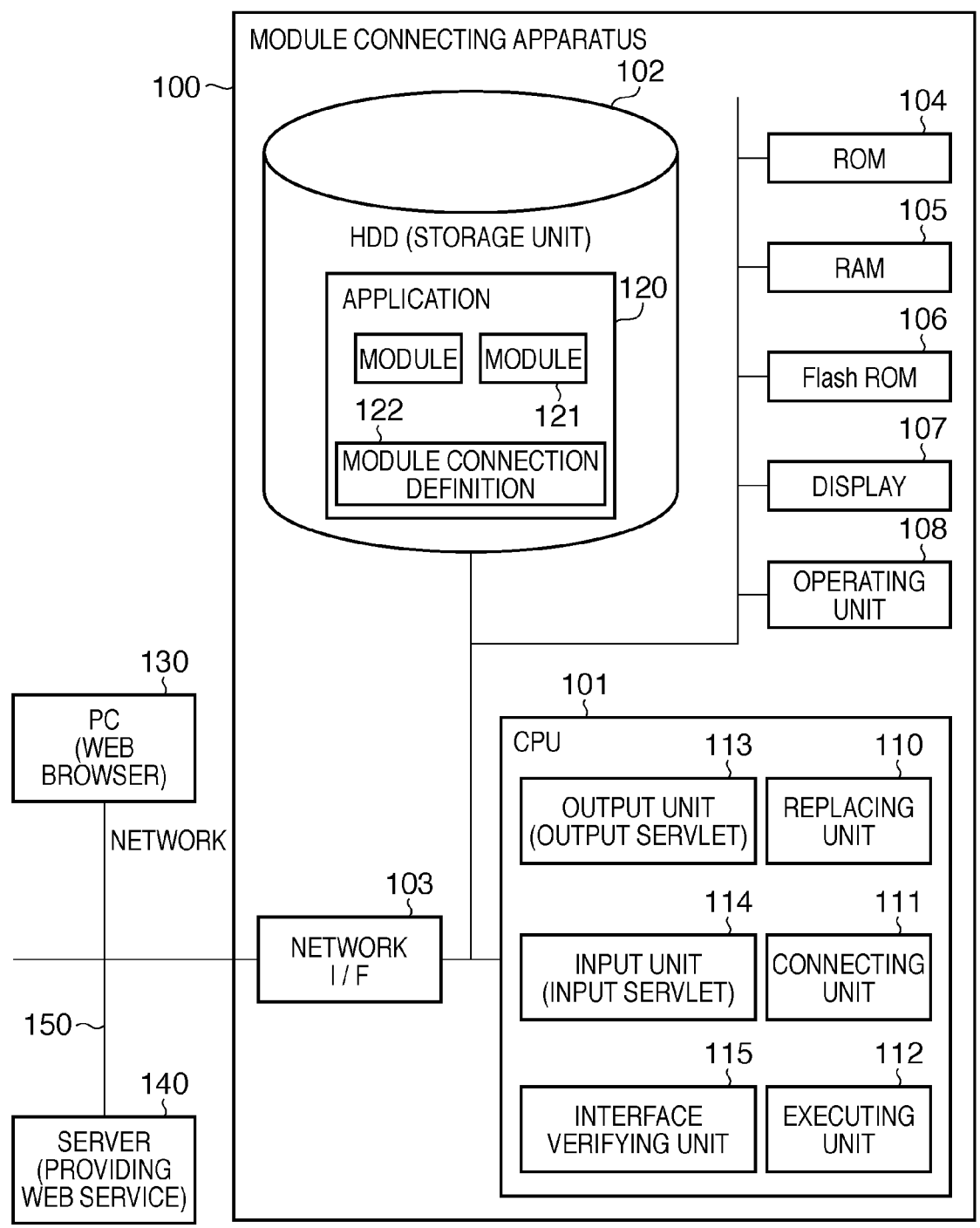
FIG. 1 is a block diagram showing a configuration of a component connecting apparatus 100.

FIG. 1 is a block diagram showing a configuration of a component connecting apparatus 100. A central processing unit (CPU) 101 shown in FIG. 1 controls the entire apparatus and also functions as a replacing unit 110, a connecting unit 111, an executing unit 112, an output unit 113, an input unit 114, and an interface verifying unit 115. The replacing unit 110, the connecting unit 111, the executing unit 112, the output unit 113, the input unit 114, and the interface verifying unit 115 represent functions of the CPU 101. The CPU 101 implements these functions by executing a program stored in a ROM 104.

A hard disk drive (HDD) 102 is a storage unit (memory), in which an application 120 is stored. The application 120 may be stored before the shipment of the component connecting apparatus 100 or may be installed in the HDD 102 after the shipment.

The application 120 includes one or more components 121 and a component connection definition 122 describing how the components 121 are connected. Besides the software provided as the components, the application 120 also includes other software, namely, an application logic (not shown). It is of course possible that the application logic uses a component 121.

The application logic uses a component 121 in the same manner as a component 121 uses another component 121. Therefore, the application logic will not be specially mentioned below.

A network I/F 103 is an interface through which the component connecting apparatus 100 is connected to a network 150 outside the apparatus. Various operation programs are stored in readable formats in the ROM 104. A RAM 105 is memory that stores temporary values and the like used while the CPU 101 is performing processing according to a program stored in the ROM 104.

A Flash ROM 106 is nonvolatile memory for storing various setting data files and the like. Since its nonvolatile nature overlaps the nature of the HDD 102, the Flash ROM 106 may be used as the storage unit in the present invention.

A display 107 is a display device that displays various sorts of information to a user. An operating unit 108, specifically a keyboard, a mouse, a touch display, or the like enables a user to perform input operations. The component connecting apparatus 100 is connected to a PC (computer) 130 and a server 140 through the network I/F 103 and the network 150. The server 140 provides Web services.

Now, in the component connecting apparatus 100 with the above configuration, component connection relationships of a connection between components 121 in the application 120 and of a connection between a component 121 and an external service will be described with reference to FIG. 2. The external service is a Web service provided by the server 140.

Figure 2:
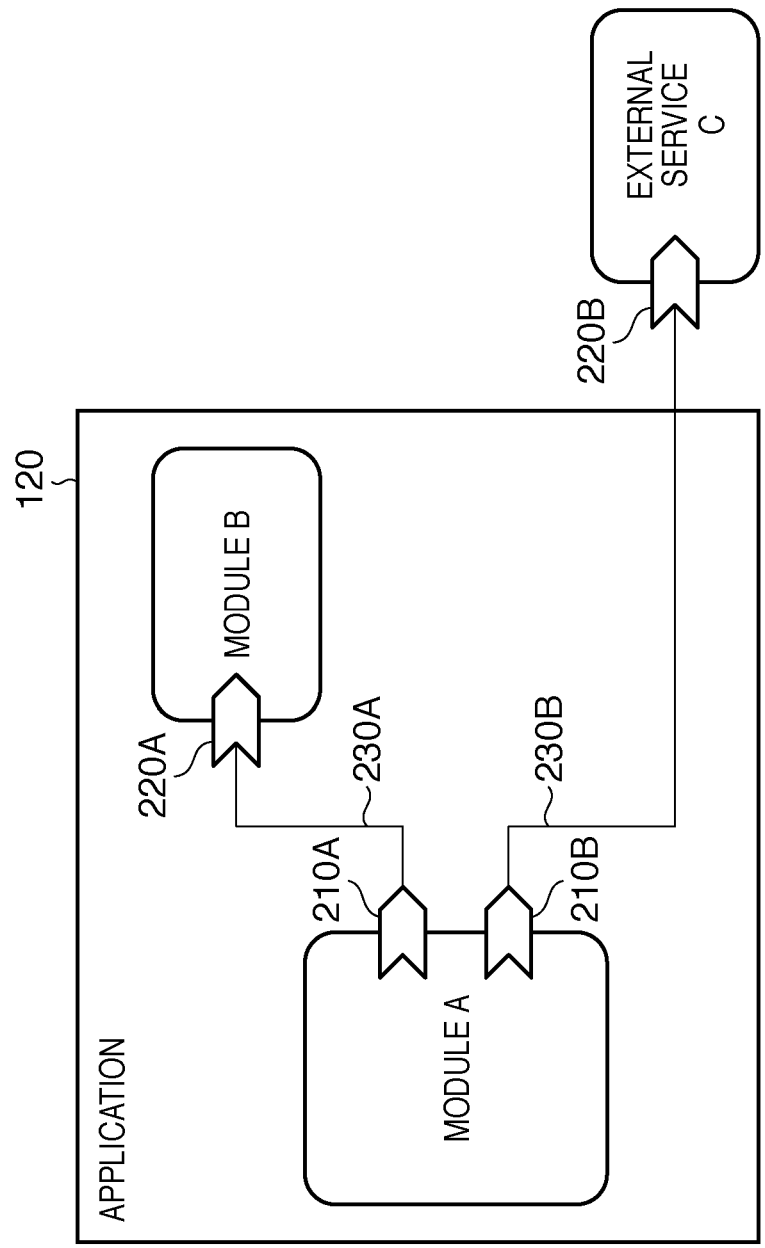
FIG. 2 is a diagram showing a connection between components and a connection between a component and an external service.

FIG. 2 is a diagram showing a connection between components and a connection between a component and an external service. According to the Service Component Architecture (SCA) specifications, an interface through which a component exposes its functions to the outside of the component is called a service, and an interface through which a component uses a service of another component is called a reference. In the example shown in FIG. 2, a component A has interfaces of two references 210A and 210B, a component B has a an interface of a service 220A, and an external service C has an interface of a service 220B. The external service C is provided by the server 140. When a reference uses a service, the reference and the service are connected.

In FIG. 2, a connection between the reference 210A and the service 220A when the component A uses the component B is represented by a relationship line 230A. A connection between the reference 210B and the service 220B when the component A uses the external service C is represented by a relationship line 230B. Here, the interfaces of the connected reference 210A and service 220A must match each other, because otherwise the reference 210A cannot use all functions of the service 220A.

Stated in the Java (R) language, a Java interface class that the reference 210A relies on must be compatible with a Java interface class that the service 220A relies on.

Specifically, the Java interface class that the service 220A relies on must be the same as or be a superset of the Java interface class that the reference 210A relies on. It is to be noted that other conditions are also described in SCA Service Component Architecture, Assembly Model Specification Version 1.00, Mar. 15 2007.

As shown in FIG. 2, a connection can be made not only between components in the same application 120 but also between the component A in the application 120 and the external service C outside the application 120. In that sense, the external service C can be treated the same as the components A and B.

FIG. 3A shows part of the component connection definition 122 in which the component connection relationships shown in FIG. 2 are described according to the SCA specifications. Although line numbers are added in FIG. 3A for the purpose of illustration, the component connection definition is actually written in an XML language format.

The line 2 indicates that the description is about the component A. The line 3 describes the reference 210A of the component A, and indicates that the name of the reference 210A is "b" and that the reference 210A is connected to the target (connected) component B. The line 4 indicates that the interface of the reference 210A relies on a Java interface class BBB (not shown).

Similarly, the lines 6 to 9 indicate that the reference 210B is connected to the external service C. The line 8 indicates that the connection is made using a Web service. A URI (Uniform Resource Identifier) required for accessing through the Web service is indicated as a uri attribute. Upon detecting that this URI has been called, the server 140 provides the service C to a caller.

The matching of the interfaces between the reference 210B of the component A and the service 220B of the external service C can be confirmed as follows. First, for the interface of the reference 210B, it is known from the line 7 that the interface relies on a Java interface class CCC. For the interface provided by the service 220B, the content of a corresponding WSDL file (not shown) is checked. Generally, in a Web service, a WSDL file that describes details of an interface of the service is provided. Therefore, by checking the WSDL file, details of the interface of the service 220B can be known. Then, whether or not the interface is compatible with the Java interface class CCC can be checked.

With reference to FIG. 4, component connection relationships between a plurality of components in the application 120 and a plurality of external services will be described. Here, the application 120 includes components A to L as the components 121.

In FIG. 2, the references and the services have been explicitly illustrated. In FIG. 4, the explicit illustration is omitted, and a connection from a component to another component is represented as a simple arrow. A solid-line arrow represents an actual connection, while a dashed-line arrow represents a connection to a connection candidate. For example, the component A is currently connected to the component B. The connection interface between the components A and B is an interface BBB. Besides the component B, two components (the components D and E) that meet the interface BBB are present in the application 120, so that the component A can also be connected with the components D and E.

If a component is currently connected to a component, it does not mean that a connection candidate also must be a component. That is, although the component F is currently connected to the component G, the component F may have, as a connection candidate, an external service C that meets its interface GGG.

The component H, as the connection indicates, is currently connected to an external service I but may have, as a connection candidate, an external service J that meets an interface III. Further, the component K is an example of a component that is currently only connected to the component L and has no connection candidates.

Here, tabular data representing the component connection relationships shown in FIG. 4 will be described with reference to FIG. 5. Data that constitutes the content of this table is stored in the RAM 105. In FIG. 5, a component column 501 is a list of components 121 having references 210. A reference column 502 lists the references 210 of the corresponding components 121 in the component column 501. Although only one reference per component is illustrated in this example, more than one reference may be present per component. In that case, more than one row is provided per component.

A component in use column 503 lists components that the corresponding references in the reference column 502 connect to. Since external services can be treated the same as the components 121 in the application 120 as described above, the component in use column 503 may contain external services.

A component candidate column 504 is a list of candidate components that the corresponding references in the reference column 502 can connect to. More than one component or external service may be contained in one cell of the component candidate column 504. An interface column 505 lists interfaces that the corresponding references in the reference column 502 rely on.

With reference to FIG. 3B, the component connection definition 122 from which the tabular data shown in FIG. 5 is generated will be described. While almost the same as the component connection definition 122 common in the SCA specifications described with reference to FIG. 3A, the component connection definition 122 in FIG. 3B additionally has an "alternative" tag. This tag is used to describe connection candidate components.

For example, in the lines 5 to 6, the components D and E are described as connection candidates for a reference a. In the lines 12 to 14, the external service C is indicated as a connection candidate for a reference f. These connection candidates are stored in the component candidate column 504.

With reference to FIG. 6, a general schematic process in which the component connecting apparatus 100 performs component replacement will be described. FIG. 6 shows part of a program stored in the ROM 104. The CPU 101 is a computer that reads the program from the ROM 104 and executes the program.

First, the component connecting apparatus 100 installs the application 120 from an external apparatus (not shown) (S601). This installing operation is performed by a user using the operating unit 108 and the display 107. When the installation is instructed through the operating unit 108, the CPU 101 downloads the application 120 via the network I/F 103 from the external apparatus connected to the network 150, and stores the application 120 in the HDD 102.

Next, when the user instructs to start the application 120 through the operating unit 108, the CPU 101 reads and analyzes the component connection definition 122 in the application 120 to perform a connection process for the components 121 in the application 120 (S602). After performing the connection process, the CPU 101 actually starts the application 120 to thereby execute code of the components 121 (S604).

When the user wants to replace a component 121 currently being used, the user instructs a replacement process for the component 121 through the PC 130 or the operating unit 108. In response to the instruction, the CPU 101 performs the replacement process for the component 121 (S605). After the replacement process for the component 121 is performed (S606), the process returns to the beginning of the loop (S603), where a component that has taken the place of the replaced component is used. That is, the CPU 101 executes code of the successor component 121 (S604).

In this example, the component 121 is executed and then replaced. However, the component 121 may be replaced immediately after the installation of the application 120, i.e., before being executed. Although not shown in FIG. 6, the application 120 may of course be stopped or uninstalled.

Figure 7:
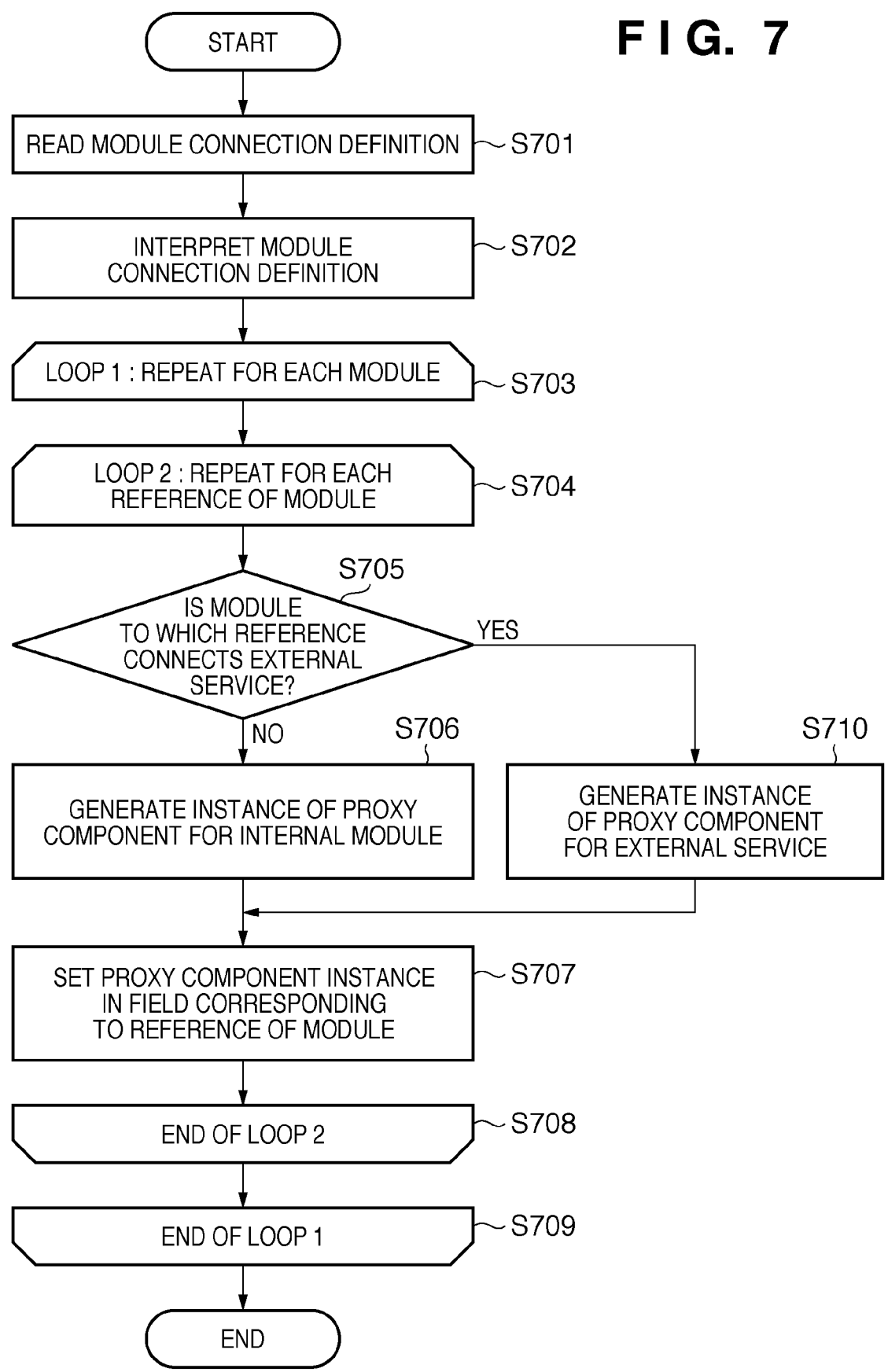
FIG. 7 is a flowchart showing details of a component connection process (S602)

With reference to FIG. 7, details of the component connection process (S602) will be described. In the sequence below, the CPU 101 functioning as the connecting unit 111 performs the component connection process.

First, the CPU 101 reads the component connection definition 122 in the application 120 stored in the HDD 102 (S701). The CPU 101 interprets the read component connection definition 122 (S702). That is, the CPU 101 interprets the component connection definition 122 written in an XML language as in FIG. 3B, generates the tabular data as shown in FIG. 5, and stores the generated data in the RAM 105.

The component connection definition 122 contains data about one or more components 121. Therefore, a process of a loop 1 from the beginning (S703) to the end (S709) is repeated for each component 121. Also, one component 121 may have one or more references. Although a component 121 may have zero references according to the SCA specifications, such a component 121 without references, incapable of connecting, is not considered here. Therefore, a process of a loop 2 from the beginning (S704) to the end (S708) is repeated for each reference.

Next, the CPU 101 determines whether or not a component to which the reference of the component being processed connects is an external service (S705). That is, the CPU 101 determines whether or not a component used by the component being processed is an external service. It has been described, with respect to the component in use column 503, that external services can be treated the same as the components 121. However, this does not mean that external services are not distinguished from the components 121. When the component connection definition 122 is interpreted in S702, information indicating whether each connected component is a component 121 in the application 120 (an internal component) or an external service is stored in the RAM 105.

If the CPU 101 determines in S705 that the connected component is not an external service but an internal component 121, the CPU 101 generates an instance of a proxy object for the internal component 121 (S706). This instance of the proxy object is an instance of a proxy class dynamically generated to meet an interface of a certain class.

In the Java language, for a certain interface class, a proxy class can be generated in a program. A typical use of a proxy class is as follows: when a program calls a method of an object of an implementation class that implements a certain interface class, a proxy class catches the call and performs some other processing at that point. A proxy class provides a function of indirectly performing a call. Since this function is useful in the component connection, this embodiment uses a proxy class.

The proxy class is generated based on an interface 401 that the reference of the component 121 relies on. Therefore, the proxy class may be generated immediately before the proxy object instance is generated in S706. It is to be understood that, if a plurality of proxy object instances are generated from the same proxy class during the execution of the loop process in FIG. 7, the proxy class needs to be generated only once rather than for each proxy object instance.

In S705 above, if the CPU 101 determines that the connected component is an external service, the CPU 101 generates an instance of a proxy object for the external service (S710). It is to be noted that the instance of the proxy object includes information related to the connected component. For example, when the instance of the proxy object is generated, class information about the connected internal component 121 or class information about an accessing component for the external service (to be described in detail later) is passed as a constructor parameter and stored in the instance. The class information is used for generating an instance of the connected internal component 121 or of the accessing component for the external service.

After the processing in S706 or S710 described above, the proxy object instance is set in a field corresponding to the reference of the component 121 (S707). The field here is an information storage location in the object of the component 121, and it corresponds to a field in terms of the Java language. Through the object set in the field, a method of another class can be called. Equivalents of this field also exist in other languages.

Figure 8:
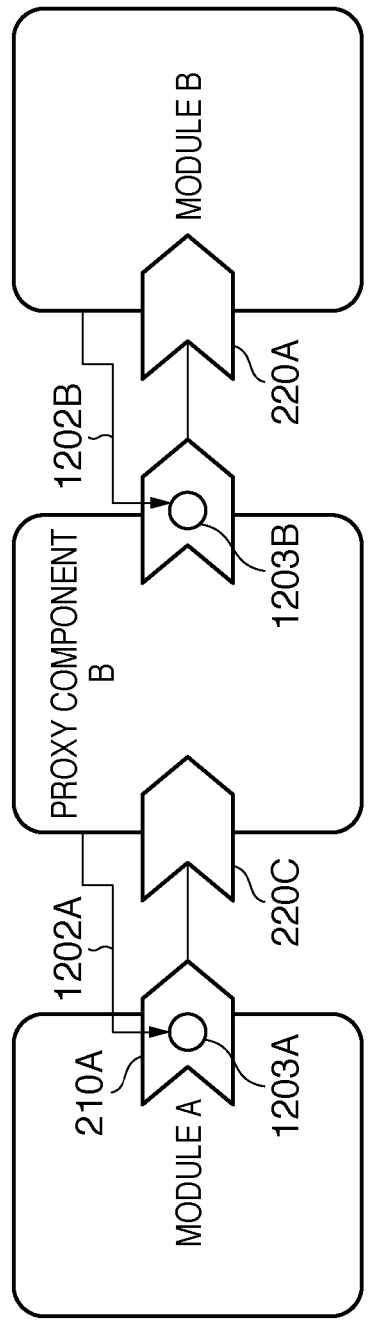
FIG. 8 is a diagram showing that a proxy object mediates between connected components A and B.

FIG. 8 shows that a proxy object mediates between the connected components A and B. Viewed from the application 120, the component A appears to be directly connected to the component B because the application 120 does not know the presence of the proxy object B.

However, the CPU 101 puts the proxy object B between the connected components. That is, the CPU 101 generates an instance of the proxy object B in S706 or S710, and sets the instance in a field 1203A corresponding to the reference 210A of the component A in S707. The setting operation is represented by an arrow 1202A. This setting interconnects the component A and the proxy object B.

The proxy object B has been generated from the proxy class that matches the interface on which the reference 210A of the component A relies. Therefore, an interface of a service 220C of the proxy object B is compatible with the interface of the reference 210A, so that the reference 210A and the service 220C are connected. That is, the component A can reliably call a method of the proxy object B through the reference 210A. The connection between the proxy object B and the component B will be described later.

Returning to the description of FIG. 7, the process reaches the end of the loop 2 in S708 and returns to the beginning of the loop S704. The process reaches the end of the loop 1 in S709 and returns to the beginning of the loop S703. Thus, the component connection procedure is finished.

Figure 9:
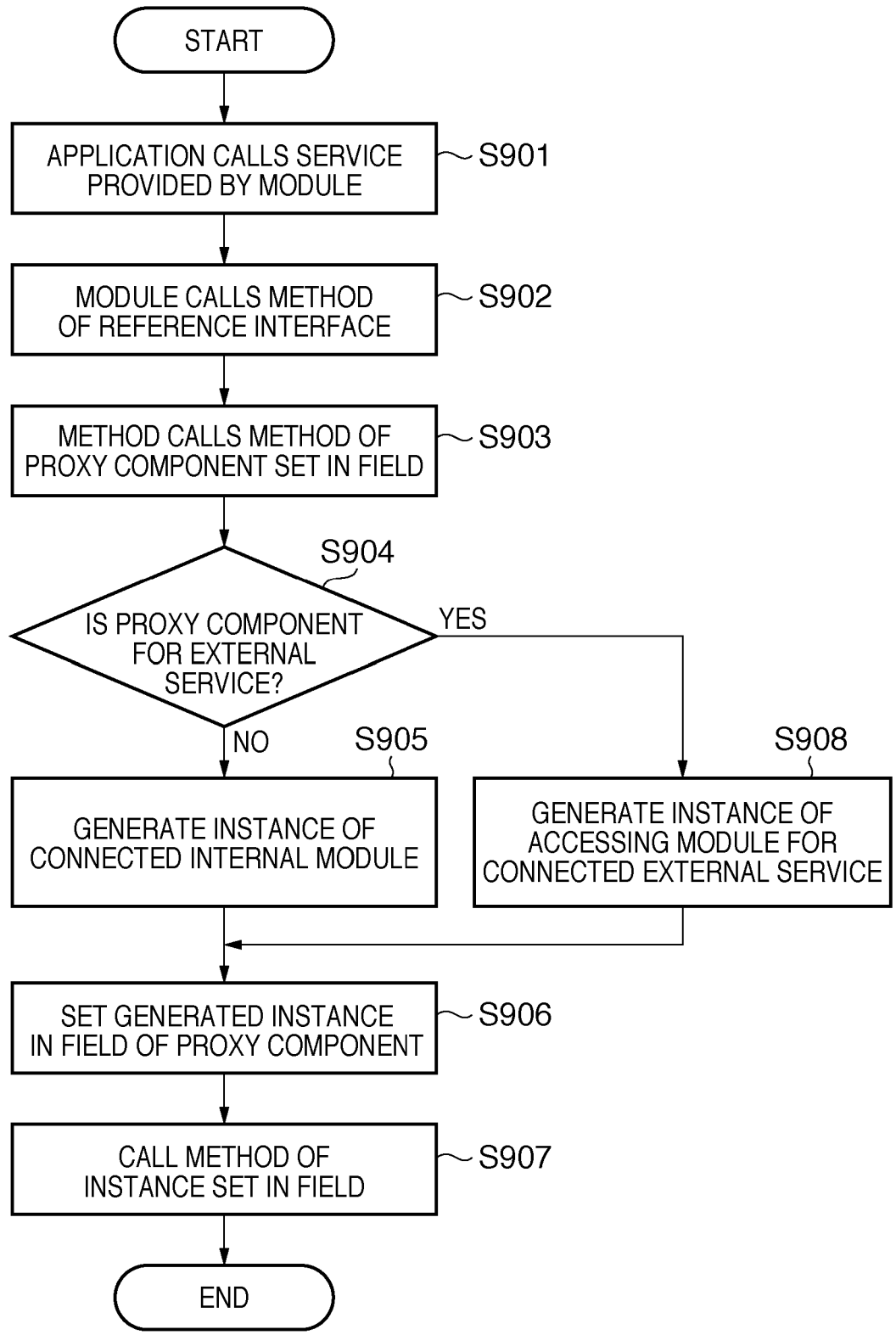
FIG. 9 is a flowchart showing details of a component execution process (S604)

With reference to FIG. 9, details of the component execution process (S604) will be described. In the sequence below, the CPU 101 functioning as the executing unit 112 performs the component execution process.

First, the application 120 calls a service provided by the component A (S901). That is, the CPU 101 calls a method that is an implementation of the service provided by the component A. It is assumed that the component A is using the component B as shown in FIG. 8. In order to use the component B, the component A calls a method of the interface that the reference 210A relies on (S902).

The method of the interface of the reference 210A calls the method of the proxy object B through the field 1203A (S903). This processing is possible because the setting in the field 1203A has been made in the component connection process as described with reference to FIGS. 7 and 8.

The method of the proxy object B determines whether or not the proxy object B itself is for an external service (S904). Information as to whether the proxy object instance has been generated for an internal component 121 or for an external service is stored at the time of generating the proxy object instance in S706 or S710, so that the determination is made based on this information. If it is determined that the proxy object is for an internal component 121, the method of the proxy object B generates an instance of the connected internal component by using the class information about the connected internal component stored in the proxy object instance (S905). Since the connected internal component is the component B in this process, an instance of the component B is generated.

Figure 10:
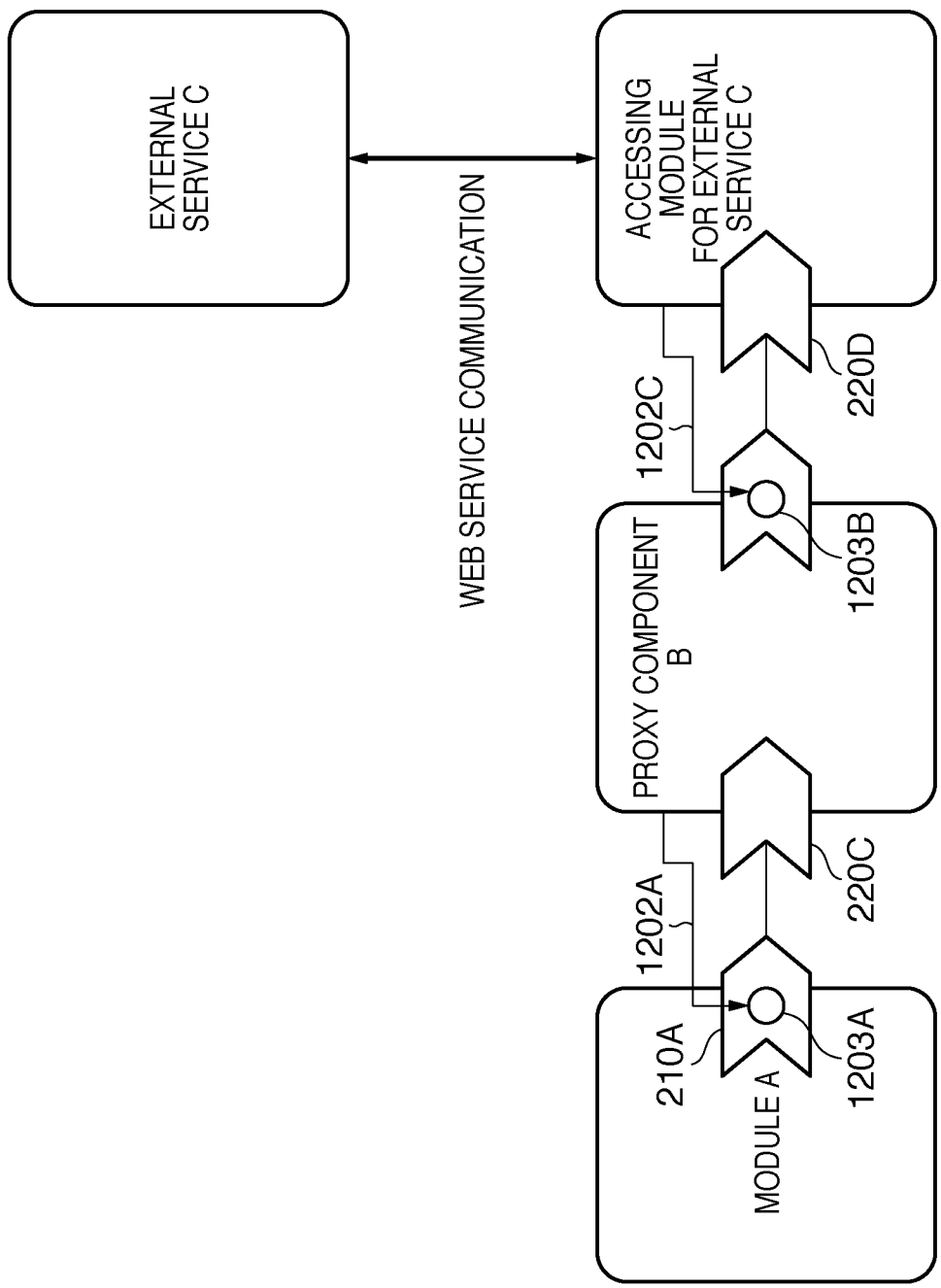
FIG. 10 is a diagram for describing a case where the component A is connected to an external service C.

If it is determined in S904 that the proxy object is for an external service, the method of the proxy object B generates an instance of an accessing component for the connected external service (S908). This instance is generated by using the class information about an accessing component for the connected external service stored in the proxy object instance. For example, as shown in FIG. 10, if the component A is connected to the external service C, an instance of an accessing component for the external service C is generated that is used for accessing the external service C.

The method of the proxy object B sets the instance generated in S905 or S908 (the instance of the connected internal component, or the instance of the accessing component for the external service C) in the field 1203B in the proxy object B (S906). The setting operation in the case where the connected component is the component B is represented by an arrow 1202B in FIG. 8. The setting operation in the case where the connected component is the external service C is represented by an arrow 1202C in FIG. 10.

Finally, the method of the proxy object B calls a method of the instance set in the field 1203B (S907). If the instance is of the component B, this method call is a method call for the component B. If the instance is of the accessing component for the external service C, this method call is a method call for the accessing component for the external service C. The method call for the accessing component for the external service C (not shown) involves performing initialization necessary for the access to the external service C and then performing an actual service access process, for example a Web service communication process with the server 140.

Through the above process, calling the component B from the component A or accessing the external service C from the component A is completed. Thus, the component execution process has been described.

Figure 11:
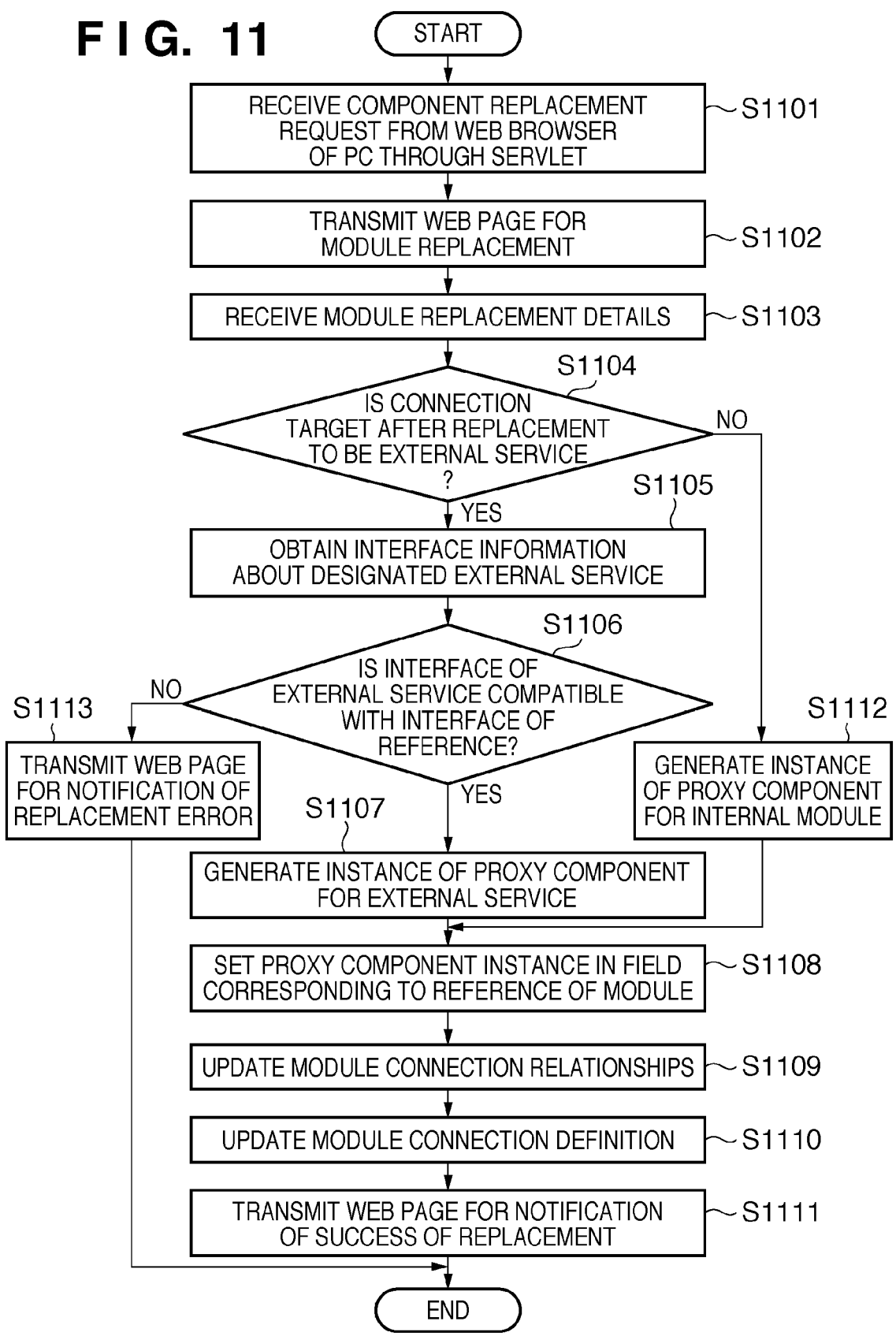
FIG. 11 is a flowchart showing details of a component replacement process (S605)

With reference to FIG. 11, details of the component replacement process (S605) will be described. In the sequence below, the CPU 101 functioning as the replacing unit 110, the output unit 113, the input unit 114, and the interface verifying unit 115 performs the component replacement process.

First, the user uses a Web browser installed in the PC 130 to access a Web page provided by the component connecting apparatus 100 (S1101). The access is performed by using the HTTP (Hyper Text Transfer Protocol) protocol. The page requested by the user is a page providing a component replacement function and is implemented with a Java servlet (the output servlet 113). The Java servlet is an example of techniques for outputting the Web page, and other languages or approaches may also be used. The output of the Web page with the Java servlet is also performed by using the HTTP protocol.

In response to a component replacement request from the Web browser in the PC 130, the output servlet 113 of the component connecting apparatus 100 transmits the Web page for component replacement to the PC 130 (S1102). The content of the Web page for component replacement (not shown) describes current component connection relationships and component connection candidates. Here, consider a case where the Web page is requested in an attempt to replace a component connected to the reference a of the component A in FIGS. 4 and 5. In this case, as shown in FIG. 4, the component B is currently connected to the reference a of the component A. Therefore, a Web page indicating the presence of the components D and E as candidate components that can be connected to the reference a is transmitted. Typically, the connection candidate components (here, the components D and E) are represented as a select list.

The user of the PC 130 views the transmitted Web page and selects a component to be connected to the reference a of the component A. For example, the user selects the component D from the select list in the Web page and presses a form submission button. This causes data describing the selected component to be transmitted from the PC 130 to the component connecting apparatus 100, and the input servlet 114 receives the data on the component replacement details (S1103).

In the example shown in FIG. 1, the output servlet 113 and the input servlet 114 are illustrated as separate components. However, they may be implemented as a single servlet. In that case, the servlet may determine whether to function as an output or as an input depending on the presence or absence of the data on the component replacement details, and may function accordingly.

The input servlet 114 passes the data on the component replacement details to the replacing unit 110. The replacing unit 110 determines whether the connection target after the replacement is to be an external service (S1104). Here, referring to the data on the component replacement details, the replacing unit 110 knows that the component to be newly connected to the reference a of the component A is the component D. That is, the connection target is not an external service but the component D, so that the replacing unit 110 generates a proxy object instance for the component D (S1112). The replacing unit 110 sets the proxy object instance in a field corresponding to the reference a of the component A (S1108).

Next, data indicating the component connection relationships (the tabular data in FIG. 5) is updated to reflect the component replacement details (S1109). Specifically, the component B in the content of the cell in the component in use column 503 corresponding to the reference a of the component A is changed to the component D. Also, the component D in the content of the cell in the component candidate column 504 is changed to the component B, while the component E remains unchanged. Thus, the component D becomes the component in use, and the component B that has been used becomes a connection candidate.

The component connection definition 122 is then updated to reflect the component replacement details (S1110). FIG. 3C shows an example of the updated component connection definition 122. From the comparison between FIGS. 3B and 3C, it can be seen that, in the line 3, the connected component corresponding to the reference a of the component A has been changed from the component B to the component D, and in the line 5, the connection candidate has been changed from the component D to the component B.

The update details of the component connection definition 122 are written to the HDD 102. In this manner, advantageously, when the component connecting apparatus 100 is restarted and the component connection process is executed, the components 121 are connected according to the replacement details.

Finally, the replacing unit 110 notifies the output servlet 113 of the success of the replacement, and the output servlet 113 transmits a Web page for notification of the success of the replacement to the PC 130 (S1111). This causes the Web page indicating the success of the replacement to be displayed on the Web browser of the PC 130, so that the user knows the success of the replacement.

Similarly, a case where the user attempts to replace the component G connected to the reference f of the component F with the external service C will be described with reference to FIGS. 11. S1101 to S1103 are similar to the above-described case. It is assumed here that the user of the PC 130 selects the external service C as the component to be connected to the reference f of the component F.

The replacing unit 110 refers to the component 121 selected by the user and determines whether or not the connection target after the replacement is to be an external service (S1104). This time, the connection target is to be an external service. Therefore, the process proceeds to S1105, where the interface verifying unit 115 obtains interface information about the external service C, which is the designated component. Specifically, the interface verifying unit 115 checks the content of a WSDL file corresponding to the external service C. The location of the WSDL file can be known from the access URI information on the external service C described in the component connection definition 122 or from WSDL file location information on the external service C (not shown).

From the obtained interface information, the interface verifying unit 115 determines whether or not an interface of the external service C is compatible with an interface of the reference f (S1106). If it is determined that the interface is compatible, the replacing unit 110 generates a proxy object instance for the external service C (S1107). The replacing unit 110 sets the proxy object instance in a field corresponding to the reference f of the component F (S1108). S1109 and subsequent steps are as described above.

Conversely, if it is determined in S1106 that the interface is not compatible, the replacing unit 110 notifies the output servlet 113 of a replacement error, and the output servlet 113 transmits a Web page for notification of the replacement error to the PC 130 (S1113). This causes the Web page indicating the replacement error to be displayed on the Web browser of the PC 130, so that the user can know the replacement error.

As shown in FIG. 3C, in the lines 10 to 14, the component connected to the reference f of the component F has been changed from the component G to the external service C. Further, although a relevant process is not described, in the lines 17 to 23 shown in FIG. 3C, a component connected to a reference h of the component H has been changed from the external service I to the external service J.

In the above-described process, the connected component candidates are output to the Web browser of the PC 130, and the user of the PC 130 selects a component to be connected out of the connected component candidates. However, the present invention is not limited to this.

When a Web page for component replacement is transmitted in S1102, a Web page with a text field for free input may be transmitted. It is assumed here that the user of the PC 130 inputs, in the text field, a URI of an external service not included in the candidates, and submits the input content to the component connecting apparatus 100. Then, the URI is input as the replacement details in S1103. Processing in S1104 and subsequent steps is similar to the above-described processing, and the newly designated external service is connected.

This time, the processing in S1109 and S1110 is a little different from the above-described processing. The newly designated external service is recognized as the component in use, and the component 121 that has been used is recognized as a connected component candidate. Therefore, the number of connection candidate components is increased by one. The tabular data shown in FIG. 5 and the component connection definition 122 are updated accordingly.

In the above embodiment, the HTTP protocol is used to output the connection candidate components and to input the selected component. Therefore, the output unit 113 is the output servlet and the input unit 114 is the input servlet.

However, the present invention is not limited to this. Other general input and output devices may be used to output the connection candidate components and to input the selected component. For example, the display 107 and the operating unit 108 may be used to similarly output the connection candidate components and input the selected component.

In the above embodiment, the output unit 113 and the input unit 114 are used to replace the components 121. Now, an approach to replacing the components 121 without using the output unit 113 and the input unit 114 will be described.

Figure 12:
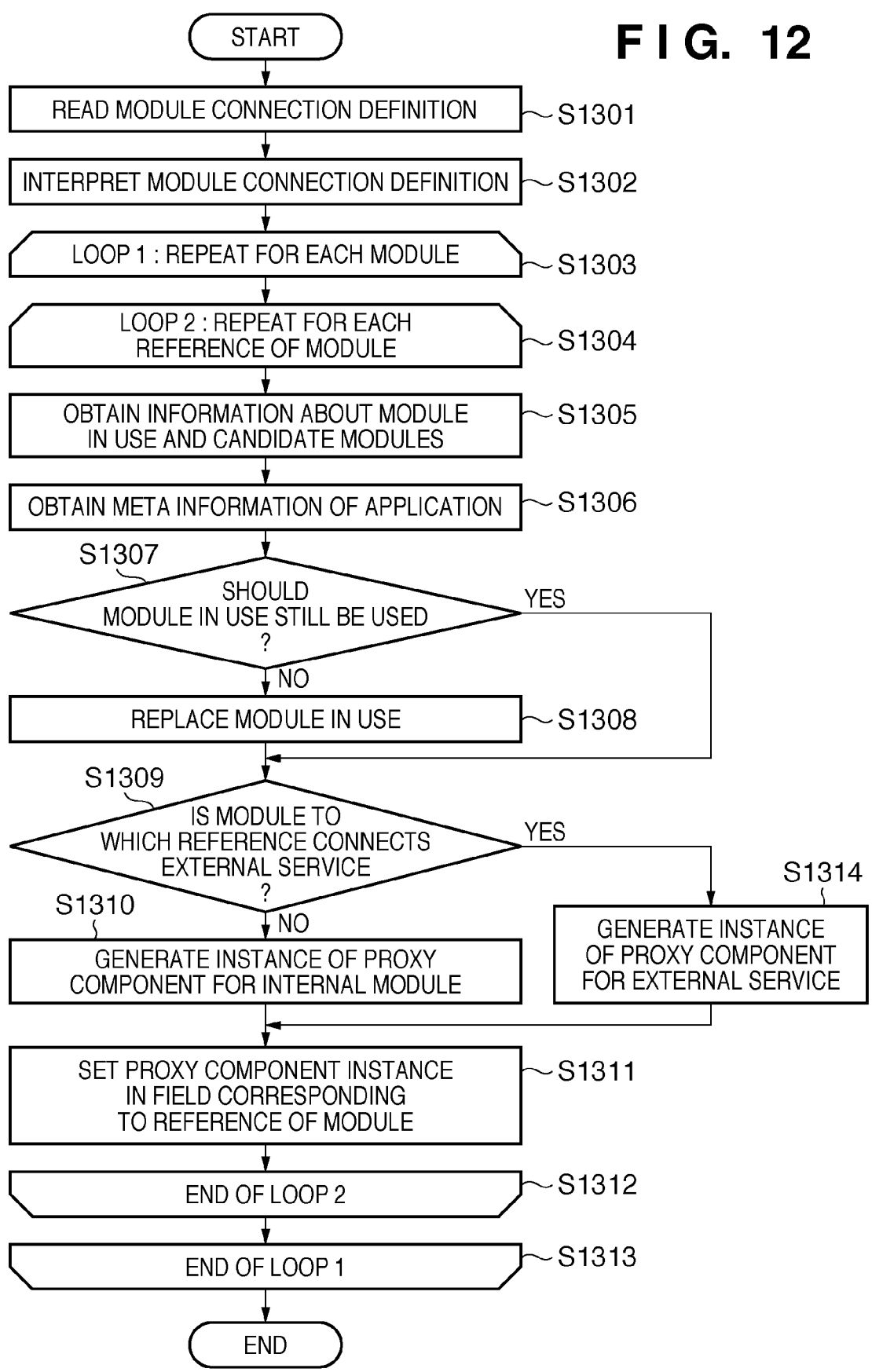
FIG. 12 is a flowchart showing a component connection process in a second embodiment.

This component connection process will be described with reference to FIGS. 12. S1301 to S1304 in FIG. 12 are similar to S701 to S704.

In S1305, the CPU 101 functioning as the connecting unit 111 obtains information about a component in use and candidate components for the reference being processed. Since the tabular data shown in FIG. 5 has been obtained in S1302, the information can be obtained from the tabular data.

Next, the connecting unit 111 obtains meta information of the application 120 (S1306). The meta information here is information accompanying the application 120 and, although not shown in FIG. 1, included in the application 120. For example, in the case of a Java application, a manifest file in a jar file corresponds to the meta information.

While various sorts of information are stored in the meta information, it is assumed here that preferentially-used component information is stored. If a component 121 specified in the preferentially-used component information is included in the candidate components, the specified component 121 should be used with higher priority over the component 121 designated as the component in use.

Next, the connecting unit 111 refers to the preferentially-used component information in the obtained meta information of the application 120 and determines whether or not the component in use corresponding to the reference being processed should still be used (S1307).

If the component in use corresponding to the reference being processed is included in the preferentially-used component information, it is determined that the component in use should still be used. Conversely, if a candidate component corresponding to the reference being processed is included in the preferentially-used component information, it is determined that the current component in use should be replaced with the candidate component.

If it is determined that the component in use should still be used, processing in S1309 and subsequent steps is performed. S1309 to S1314 are similar to S705 to S710.

If it is determined that the component in use should be replaced, the current component in use is replaced with the candidate component included in the preferentially-used component information (S1308). Specifically, as described for S1109 and S1110, the tabular data and the component connection definition 122 are updated. The processing in S1309 and subsequent steps is then performed.

In this example, candidate component information is stored as the preferentially-used component information. Instead, information about a new external service may be stored. In that case, processing is performed as in the above-described case where a new external service not included in the candidates is input as a component to be used.

Also, in the described approach, the preferentially-used component information in the meta information of the application 120 is used to perform the component replacement. However, other approaches may be employed. For example, the Flash ROM 106 may store the preferentially-used component information, which is read by the connecting unit 111 to determine whether or not to replace the component in use.

Even the preferentially-used component information may not be used. For example, the connecting unit 111 may obtain spec information about the component connecting apparatus 100. A determination may then be made such that the component D should be used if the specs of the apparatus are not below a predetermined level, or the component B should be used if the specs are below the predetermined level.

According to the above-described embodiments, components can be replaced at the time of running an application without the need to redevelop the application. A component can be replaced only by selecting a connection candidate component, so that the component replacement can be easily performed at the time of running the application.

In addition, the ability to designate an external service and to verify an interface allows reliable coordination with a service unintended by the application. For example, it is possible to coordinate with a network service created after an application has been made.

The present invention is also realized by performing the following process: software (a program) that implements the functions of the above-described embodiments is supplied to a system or apparatus via a network or various storage media, and a computer (or a CPU, MPU, etc.) of the system or apparatus reads and executes the program.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-106665, filed May 6, 2010, which is hereby incorporated by reference herein in its entirety.

What is claimed is:

1. A connecting method, performed by at least one processor, for connecting a component included in an application with an external service provided by a server, the method comprising:
   obtaining information of an interface of the external service in accordance with data on component replacement details, which is received from a computer that instructs replacement of a component, indicating that a connection target after the replacement is the external service;
   determining whether the interface of an external service indicated by the information obtained in said obtaining step is compatible with an interface through which a component to be processed connects with another component and uses a service of the other component;
   replacing a connection between the component to be processed and the other component so that the component to be processed is connected with the external service, if it is determined that the interface of the external service indicated by the information obtained in said obtaining step is compatible with the interface through which the component to be processed connects with the other component and uses the service of the other component; and
   executing the component connected with the external service.

2. The method according to claim 1, wherein said determining step comprises determining whether an interface of an external service selected based on settings indicating components capable of being used by the component to be processed is compatible with the interface.

3. The method according to claim 1, wherein said determining step comprises outputting external services capable of being used by the component to be processed to an external device and determining whether an interface of an external service designated in the external device is compatible with the interface.

4. The method according to claim 1, wherein said replacing step comprises replacing a definition in which the other component connected with the component to be processed and candidate components connectable with the component to be processed are described as a modification of the connection between the component to be processed and the other component.

5. The method according to claim 1, wherein said replacing step comprises modifying a connection definition between the component to be processed and the other component so that the component to be processed is connected with the external service and the other component is described as a candidate component for connection.

6. The method according to claim 1, wherein said replacing step comprises modifying a connection definition indicating a connection relation between the component to be processed and the other component described according to a Service Component Architecture (SCA) specification as the modification of the connection between the component to be processed and the other component.

7. The method according to claim 1, wherein said determining step comprises determining whether a class of the external service satisfies a condition of a class of the interface through which the component to be processed uses the service of the other component.

8. The method according to claim 1, wherein said determining step comprises determining whether an interface of an external service designated as a preferentially-used component is compatible with the interface through which the service of the other component is used.

9. A non-transitory storage medium having stored therein a computer program for connecting a component included in an application with an external service provided by a server, the computer program implementing a method comprising:
   obtaining information of an interface of the external service in accordance with data on component replacement details, which is received from a computer that instructs replacement of a component, indicating that a connection target after the replacement is the external service;
   determining whether the interface of an external service indicated by the information obtained in said obtaining step is compatible with an interface through which a component to be processed connects with another component and uses a service of the other component;
   replacing a connection between the component to be processed and the other component so that the component to be processed is connected with the external service, if it is determined that the interface of the external service indicated by the information obtained in said obtaining step is compatible with the interface through which the component to be processed connects with the other component and uses the service of the other component; and
   executing the component connected with the external service.

10. The non-transitory storage medium according to claim 9, wherein said determining step comprises determining whether an interface of an external service selected based on settings indicating components capable of being used by the component to be processed is compatible with the interface.

11. The non-transitory storage medium according to claim 9, wherein said replacing step comprises replacing a definition in which the other component connected with the component to be processed and candidate components connectable with the component to be processed are described as a modification of the connection between the component to be processed and the other component.

12. The non-transitory storage medium according to claim 9, wherein said determining step comprises determining whether a class of the external service satisfies a condition of a class of the interface through which the component to be processed uses the service of the other component.

13. A connecting apparatus for connecting a component included in an application with an external service provided by a server, the apparatus comprising:
 an obtaining unit that obtains information of an interface of the external service in accordance with data on component replacement details, which is received from a computer that instructs replacement of a component, indicating that a connection target after the replacement is the external service;
 a determination unit that determines whether the interface of an external service indicated by the information obtained by said obtaining unit is compatible with an interface through which a component to be processed connects with another component and uses a service of the other component;
 a replacement unit that replaces a connection between the component to be processed and the other component so that the component to be processed is connected with the external service, if it is determined that the interface of the external service indicated by the information obtained by said obtaining unit, is compatible with the interface through which the component to be processed connects with the other component and uses the service of the other component; and
 an execution unit that executes the component connected with the external service,
 wherein a processor is included in the apparatus, and
 wherein the processor is configured to function as at least one of the determination unit, the replacement unit, and the execution unit.

14. The apparatus according to claim 13, wherein the determination unit determines whether an interface of an external service selected based on settings indicating components capable of being used by the component to be processed is compatible with the interface.

15. The apparatus according to claim 13, wherein the replacement unit replaces a definition in which the other component connected with the component to be processed and candidate components connectable with the component to be processed are described as a modification of the connection between the component to be processed and the other component.

16. The apparatus according to claim 13, wherein the determination unit determines whether a class of the external service satisfies a condition of a class of the interface through which the component to be processed uses the service of the other component.

* * * * *